United States Patent [19]

Urbánek et al.

[11] Patent Number: 4,843,207
[45] Date of Patent: Jun. 27, 1989

[54] METHOD AND APPARATUS FOR SELECTIVE CREATION OF A DECOR ON HOLLOW AXIALLY-SYMMETRIC PRODUCTS BY A LASER BEAM

[75] Inventors: Peter Urbánek; Peter Farkas; Rudolf Cvopa, all of Trencín; Mária Fasková, Banská Bystrica; Jaroslav Drbohlav, Turnov, all of Czechoslovakia

[73] Assignee: Vyskumny a vyvojovy ustav sklarsky, Trencin, Czechoslovakia

[21] Appl. No.: 142,178

[22] Filed: Jan. 11, 1988

[51] Int. Cl.$^4$ .............................................. B23K 26/00
[52] U.S. Cl. ........................... 219/121.6; 219/121.68; 219/121.79; 219/121.80
[58] Field of Search ...... 219/121 L, 121 LH, 121 LJ, 219/121 LM, 121 LQ, 121 LR, 121 LU, 121 LW, 121 LV, 121.6, 121.68, 121.69, 121.85, 121.74, 121.75, 121.78, 121.80, 121.79

[56] References Cited

U.S. PATENT DOCUMENTS

| | | | |
|---|---|---|---|
| 3,772,496 | 11/1973 | Harendza-Harinxma | 219/121 LJ |
| 4,092,518 | 5/1978 | Merard | 219/121 LJ |
| 4,564,737 | 1/1986 | Burke et al. | 219/121 LH |
| 4,568,814 | 2/1986 | Hamasaki et al. | 215/121 LH |

Primary Examiner—C. L. Albritton
Attorney, Agent, or Firm—Klein & Vibber

[57] ABSTRACT

A method and apparatus for creation of a decor on hollow axially symmetrical products is primarily useful in the glass industry. A laser beam acts from the interior of a hollow twin layer product through an internal sufficiently permeable layer to an external highly absorbent layer in order to cause a phase change of the external layer. The apparatus includes a laser, a lens, a mirror situated on the axis of symmetry of the product and also drives for translational movement of the lens and of the mirror and for a rotational movement of the mirror, controlled by a microcomputer or an optical pick-up device with a sample of the decor. A laser beam with a wavelength of the spectrum between 0.5 to 2.0 μm is best suited for this purpose.

5 Claims, 1 Drawing Sheet

METHOD AND APPARATUS FOR SELECTIVE CREATION OF A DECOR ON HOLLOW AXIALLY-SYMMETRIC PRODUCTS BY A LASER BEAM

FIELD OF THE INVENTION

The invention relates to a method of selective creation of a decor on hollow axially-symmetric products by a laser beam and to an arrangement for execution of this method.

BACKGROUND OF THE INVENTION

Known methods and arrangements for working of axially symmetric products from glass by a laser beam are disclosed in DDR patent specification No. 112, 941, U.S. Pat. Nos. 3,770,936 and 3,701,880 and in the Czechoslovak certificate of authorship No. 213,081. All these cited methods are based on the principle of a sufficient absorption of glass of a certain wave length of a laser beam.

A drawback of abovementioned known methods and arrangements is that the laser heat does not pass through the glass mass, but is absorbed within the thin glass surface layer and the required decor is created on the glass surface by evaporation of a local thin glass layer with an accompanying creation of microcracks. A further drawback of the abovementioned known methods and arrangements is the requirement that the laser heat act on the axially-symmetric product from the external side, the resulting necessity of a central clamping and rotation of the axially-symmetric product around the axis of symmetry and a practically rather demanding manipulation of the product.

It is an object of this invention to substantially eliminate the above mentioned drawbacks of creation of a decor on hollow axially-symmetric products by a laser beam.

SUMMARY OF THE INVENTION

The inventive method can be used on hollow axially-symmetric products comprising two layers, whereby the internal layer is made from a material of a maximum thickness of 40 mm, having an absorption coefficient of maximally 29%, whereas the external layer is formed from a material of a maximum thickness of 1.2 mm with an absorption coefficient of minimally 75%, whereby the limits of absorption coefficients are considered at wave lengths between 0.5 to 2.0 $\mu$m.

According to the invention, a laser beam having a wave length of 0.5 to 2.0 $\mu$m is used, acting identically with the axis of symmetry of the hollow product with an allowance of maximum ±10 mm, whereby the laser beam acts from the internal part of the hollow product through the internal to the external layer of the hollow product in order to cause a phase change of the external layer. The laser beam, controlled by an optical-mechanical system, performs on the external layer of the hollow product a combined movement consisting of a rotational movement around the axis of symmetry of the hollow product according to the equation:

$$x^2(z)+y^2(z)=r^2(z)$$

and of a movement in the direction of the axis of symmetry of the hollow product according to the equation:

$$z=f(t)$$

where f(t) is a function increasing time, where a rectangular Cartesian system of coordinates is used and x(z) is the x-interaction and the y(z) the y-interaction of the laser beam with the external layer in the plane z, where r(z) is the radius of the wall of the external layer of the hollow product in the plane z and the center of the stand of the product is the start of the system of coordinates.

The apparatus for execution of the selective method for creation of a decor on hollow axially symmetric products by a laser beam comprises a laser, a lens, a mirror situated in the axis of symmetry of the worked product and their drives for a rotational and translational movement by means of which the control of creation of the decor is secured by an optical pick-up device of a sample of the decor or by a microcomputer. An advantage of the invention is that the mirror is situated slidingly and rotatably in the axis of symmetry of the hollow product.

Other advantages of the invention are: that the laser beam passes through the layer of the internal material of the wall of the hollow product without damaging the material and causes in the material of the external layer of the wall of the product a phase change; the ability to create a complete automation of the process, as the decored product need not be rotated in the course of the proper process around the axis of symmetry, i.e. it need not be clamped by some clamping means and can be freely standing on a stable support. This advantage is of extraordinary importance in case the decored products have no ideal shape (deviations of diameter, eccentricity, axial deviation, ellipticity).

The selectivity of the method according to this invention is characterized by the fact that the laser heat itself selectively chooses where it has to cause a phase change of the material and where no such change has to be made according to the dependence of absorption coefficients of different materials on the wave length of the laser beam.

BRIEF DESCRIPTION OF THE DRAWING

With these and other objects in view, which will become apparent in the following detailed description, the present invention, which is shown by example only, will be clearly understood in connection with the accompanying drawing, in which.

DESCRIPTION OF THE PREFERRED EMBODIMENTS

Figure 1:
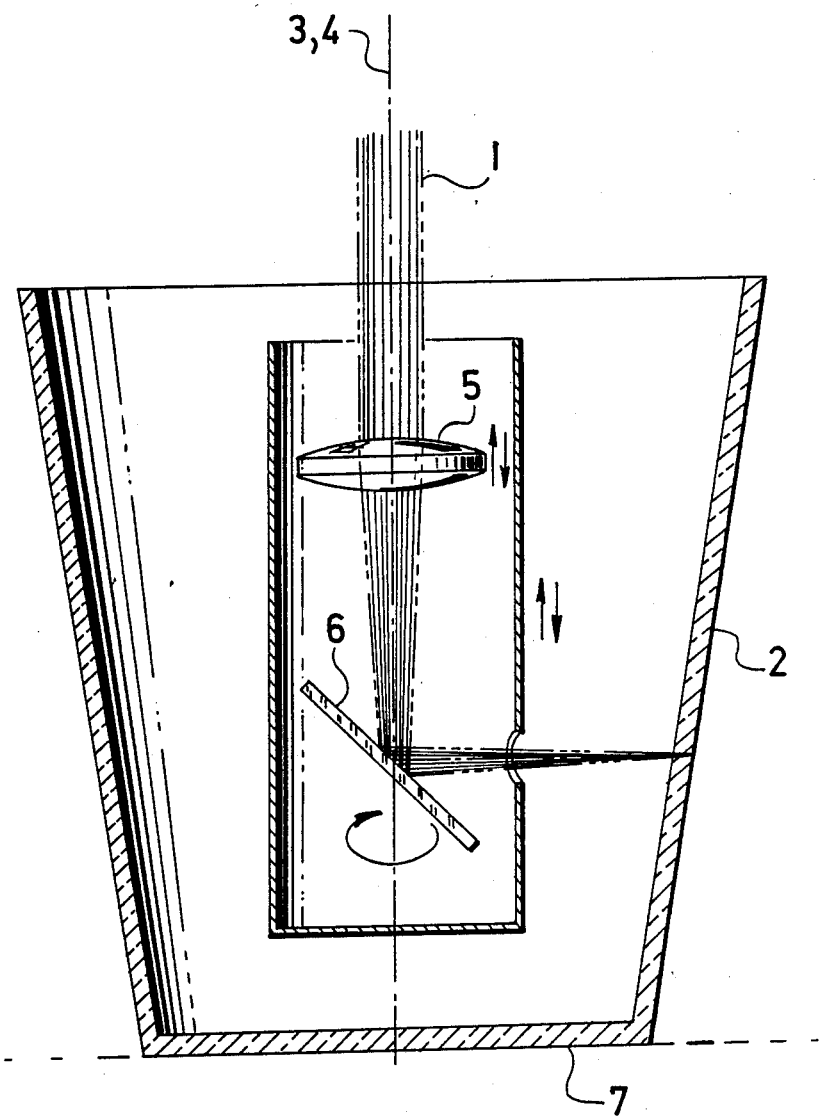
FIG. 1 is a perspective view, partially cut away, of a hollow axially symmetrical product with a schematic representation of the invention.
Figure 2:
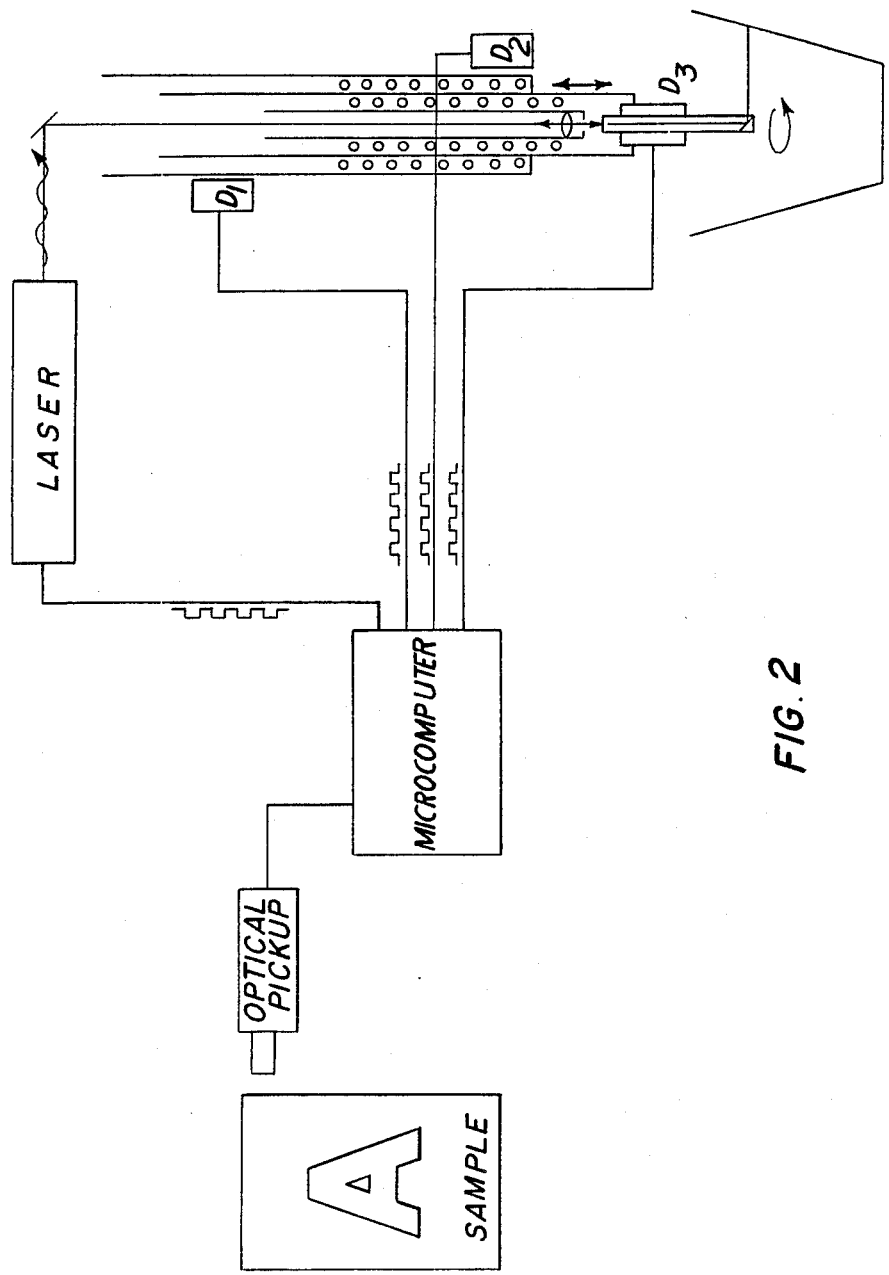
FIG. 2 is a schematic diagram of an apparatus in accordance with the invention.

The objects of this invention will be more clearly described by way of an examplary embodiment for decoration of a utility glass by a laser beam in connection with the attached drawing showing in elevation the action of a laser beam on a product to be decorated.

The method of the invention has been applied on a hollow, axially symmetrical product consisting of two layers. Its internal layer is formed of clear glass. Clear glass is generally optically well permeable within wave lengths from 0.5 to 2.0 $\mu$m, i.e. the absorption coefficient of clear glass is lower than 29%. One may use, for example, a laser beam generated by a solid material laser Nd : YAG (including an acoustic-optic Q-shutter). The hollow axially-symmetric product of glass may be for instance a small cup, a cup, a vase, an ash tray or some other kind of utility glass. This glass product is refined on the external mantle by the classical method of transparent coating, listering, application of glass colors or layers of precious metals. I.e., the hollow axially-symmetric product thus comprises two layers: clear glass - transparent coating, or clear glass - lister, clear glass - glass color, or clear glass - layer of precious metal. The thin layer of the external mantle has a thickness smaller than 1.2 mm and the absorption coefficient of the material of this layer for the wave length of the Nd : YAG laser is higher than 75%.

The laser beam is applied identically with the axis of symmetry of the hollow product with a maximum allowance of ±10 mm, is controlled mechanically-optically, and acts from the interior of the hollow product to the external layer of the hollow product, i.e. it passes through the clear glass to the thin layer of the external mantle of transparent coating, lister, glass color or precious metal. The laser beam does not evaporate the material of the internal layer, nor does damage or create microcracks in this material. I.e., the laser beam does not evaporate clear glass, it causes no visual damage to it nor does it create microcracks in the glass. The laser beam causes, in the course if its acting from the interior, a phase change of the external layer of the hollow product, i.e. it causes, after passage through clear glass, evaporation of the thin layer of the external mantle (transparent coating, lister, glass color or precious metal).

The laser beam, controlled by an optical-mechanical system, performs along the internal layer of the hollow product a combined movement consisting of rotational movement around the axis of symmetry of the hollow product according to the equation:

$$x^2(z)+y^2(z)=r^2(z)$$

and of a movement in the direction of the axis of symmetry of the hollow product according to the equation:
$$z=f(t)$$

where f(t) is a function increasing in time, a defined rectangular Cartesian system is used for the coordinates and x(z) is the x-coordinate and y(z) the y-coordinate of interaction of the laser beam with the external layer in the plane z and r(z) is the radius of the internal wall of the external layer of transparent coating, lister, glass color or precious metal on the product from clear glass in the plane z and the center of the support of the product coincides with the start (origin) of the mentioned coordinates of the system.

Referring now to the figures, the apparatus for execution of the method of creation of a decor on hollow axially-symmetrical products by a laser beam comprises a laser 1, a lens 5, a mirror 6 and drives $D_1$, $D_2$, $D_3$ for a translational movement of the lens 5 and of the mirror 6 and for a rotational movement of the mirror 6 and an optically-electronic or electronic control for creation of the decor, which is secured by an optical pick-up device of the decor sample or by a microcomputer. The attached drawings only show the part of the whole arrangement which relates to the object of this invention. Moreover, the drawings show of course only one possible embodiment of this arrangement.

The axially-symmetrical product 2 where the decor is to be made consists of a material with two layers and stands in the course of decoration by its support 7 on a stable base. The product 2 does not turn around its axis of symmetry in the course of decoration.

The laser beam 1 having a wave length of 0.5 to 2.0 μm is applied identically with the axis of symmetry 3 of the product with a maximum allowance of ±10 mm. The laser beam is focused by the lens 5 whereby the lens 5 is supported in sliding fashion in the directing of the axis 3 of symmetry of the product 2 and the optical axis 4 of the lens 5 is identical with the axis 3 of symmetry within an allowance of ±10 mm. The mirror 6 is arranged in the axis 3 of symmetry of the hollow product slidably and rotatably.

The drives for translational and rotational movements secure the movement of the lens 5 and of the mirror 6 in direction of the axis 3 of symmetry of the product 2, the movement of the lens with respect to the mirror 6 so that the focus of the lens remains always on the external surface of the mantle of the product 2 and also a rotation of the mirror 6, whereby the axis of rotation of the mirror 6 is identical with the axis 3 of symmetry of the product 2.

The solution according to this invention enables creation of a decor on the product 2 by a phase change of the external layer of the mantle of the product according to the character of a decor determined by equations:

$$x^2(z)+y^2(z)=r^2(z) \text{ and}$$

$$z=f(t)$$

where f(t) is a function increasing in time.

The laser beam 1 can be interrupted by an external electronic signal comprising information about the sample of the decor. A suitable example of a beam of a laser 1 can be by a beam obtained from a solid material continuous Nd : YAG laser with an acoustical-optical Q shutter.

A suitable method and arrangement for securing the control of the laser beam according to the sample of the decor is an optical pick-up device of a sample of the decor or a microcomputer. The optical pick-up device of the sample of the decor operates by a method similar to a telephoto (facsimile) transmitter and the obtained electronic signals cut in on the line of the beam of the laser 1.

The main advantages of application of the described method and arrangement according to this invention are in the glass industry. Clear glass has, within the range of wave lengths from 0.5 to 2.0 μm, a low absorption coefficient and on the other hand the thin layer of transparent coating, lister, glass color or precious metal has, within the mentioned wavelength range, a high absorption coefficient. The decoration effect created by the phase change of the thin external layer on clear glass obtained according to this invention is of high quality, smooth and assortments of decors or markings can be quickly changed according to requirements of clients without a negative economic effect on the performance of the arrangement.

Other possible applications for the method and arrangement according to this invention are the creation of a decor or of grids in hollow axially symmetrical products both on the external or internal layer of the mantle of the product where the laser beam acts from the interior of the product beyond the product.

Although the invention is described and illustrated with reference to a single embodiment thereof, it is to be expressly understood that it is in no way limited to the disclosure of such preferred embodiment but is capable of numerous modifications within the scope of the appended claims.

We claim:

1. A method for selective creation of a decor on a hollow axially symmetrical product by a laser beam comprising the steps of
preparing the product to consist of an internal and an external layer, the internal layer formed by a material having a maximum thickness of 40 mm with a maximum absorption coefficient of 29% and the external layer formed of a material having a maximum thickness of 1.2 mm with a minimal absorption coefficient of 75% where the laser beam has a wave length of from 0.5 to 2.0 μm;
arranging said laser beam coaxial with the axis of symmetry of the hollow product with a maximum allowance of ±10 mm; and
reflecting said laser beam from the interior of the hollow product through the internal layer to the external layer of the hollow product in order to achieve a phase change of the external layer.

2. A method for selective creation of a decor on a hollow axially symmetrical product by a laser beam as claimed in claim 1 where the laser beam performs along the external layer of the hollow product a combined movement composed of a rotational movement around the axis of symmetry according to the equation:

$$x^2(z)+y^2(z)=r^2(z)$$

and of a translational movement in the direction of the axis of symmetry of the hollow product according to the equation:

$$z=f(t)$$

whereby f(t) is a function increasing in time, x(z) is the x-coordinate and y(z) the y-coordinate of the interaction of the laser beam with external layer of the product in a plane z, and r(z) is the radius of an internal wall of the external layer of the hollow product in the plane z.

3. An apparatus for selective creation of a decor on a hollow axially symmetrical product by a laser beam comprising
a laser, a lens, and a mirror all situated along the axis of symmetry of the product; and
a plurality of drives for rotational and translational movement of said mirror and translational movement of said lens;
and
means for controlling the creation of the decor according to a sample.

4. An apparatus for selective creation of a decor on a hollow axially symmetrical product by a laser beam as claimed in claim 3 wherein said means for controlling is a microprocessor.

5. An apparatus for selective creation of a decor on a hollow axially symmetrical product by a laser beam as claimed in claim 3 wherein said means for controlling is an optical scanner which scans said sample.

* * * * *